US008397064B2

(12) United States Patent
Khermosh et al.

(10) Patent No.: US 8,397,064 B2
(45) Date of Patent: Mar. 12, 2013

(54) IMPLEMENTING IEEE 802.1AE AND 802.1 AF SECURITY IN EPON (1GEPON AND 10GEPON) NETWORKS

(75) Inventors: Lior Khermosh, Givatayim (IL); Zachy Haramaty, Ramat Gan (IL); Jeff Mandin, Jerusalem (IL)

(73) Assignee: PMC Sierra Ltd., Herzlia Pituach (IL)

( * ) Notice: Subject to any disclaimer, the term of this patent is extended or adjusted under 35 U.S.C. 154(b) by 395 days.

(21) Appl. No.: 12/652,057

(22) Filed: Jan. 5, 2010

(65) Prior Publication Data

US 2010/0174901 A1 Jul. 8, 2010

Related U.S. Application Data

(60) Provisional application No. 61/142,392, filed on Jan. 5, 2009.

(51) Int. Cl.
*H04L 29/06* (2006.01)
(52) U.S. Cl. .......................... 713/160; 380/256
(58) Field of Classification Search .................. 726/13, 726/14; 713/153, 160, 161, 162, 163; 380/256
See application file for complete search history.

(56) References Cited

U.S. PATENT DOCUMENTS

| | | | |
|---|---|---|---|
| 2005/0008158 A1* | 1/2005 | Huh et al. | 380/256 |
| 2006/0136715 A1* | 6/2006 | Han et al. | 713/151 |
| 2007/0269212 A1* | 11/2007 | Remein et al. | 398/63 |
| 2008/0263248 A1* | 10/2008 | Harriman | 710/243 |

OTHER PUBLICATIONS

IEEE Standard for Information technology—Telecommunications and information exchange between systems—Local and metropolitan area networks—Specific requirements, Part 3: Carrier Sence Muliple Access With Collision Detection (CSMA/CD) Access Method and Physical Layer Specifications, IEEE Std 802.av, Oct. 30, 2009, pp. 1-214.
802.3ah—IEEE Standard for Information technology—Telecommunications and information exchange between system▲ Local and metropolitan area network Specific requirements Part 3: Carrier Sense Multiple Access with Collision Detection (CSMA/CD) Access Method and Physical Layer Specifications Parameters, Physical Layers, and Management Parameters for Subscriber Access Networks, Sep. 7, 2004, pp. 1-640.
802.3AE—IEEE Standard for Local and metropolitan area networks, Media Access Control (MAC) Security,IEEE Computer Society, Aug. 18, 2006, pp. 1-142.
802.1X 2010—IEEE Standard for Local and metropolitan area networks, Port-Based Network Access Control,IEEE Computer Society, Feb. 5, 2010, pp. 1-205.

\* cited by examiner

*Primary Examiner* — Edward Zee
(74) *Attorney, Agent, or Firm* — Mark M. Friedman

(57) ABSTRACT

A method and system is provided for securing communication on an EPON. Particularly different types of encrypted messages, each with a respective short MAC SegTAG, may be sent from the OLT to an ONU and from an ONU to the OLT without need for a full SecTAG with an explicit SCI. Discovery and control messages may be encrypted and a security offset may be less than 30 bytes. A packet header including its MAC address may be encrypted.

29 Claims, 11 Drawing Sheets

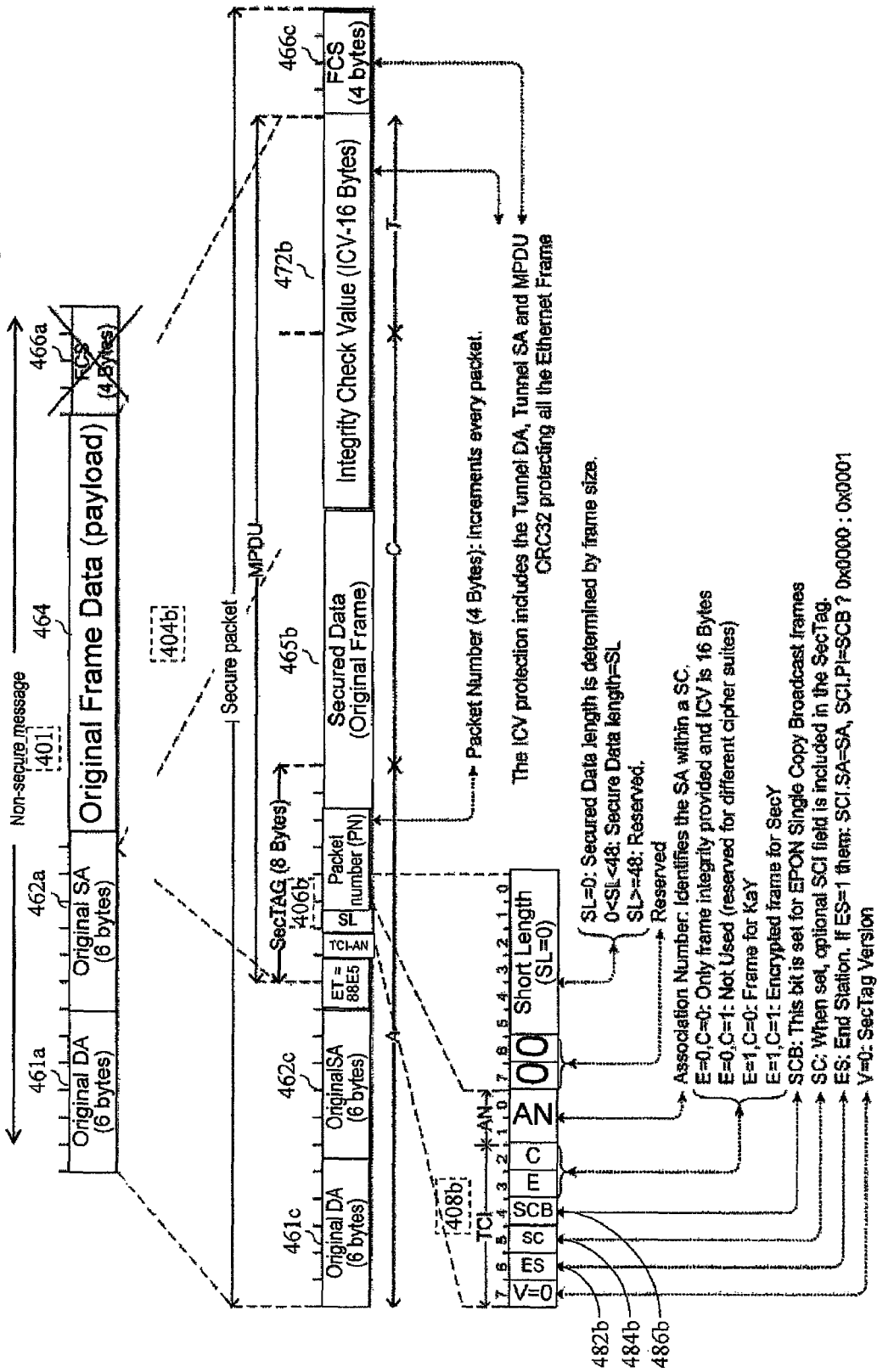
Figure 4b: A secured packet with a short SecTag

IMPLEMENTING IEEE 802.1AE AND 802.1 AF SECURITY IN EPON (1GEPON AND 10GEPON) NETWORKS

This patent application claims the benefit of U.S. Provisional Patent Application No. 61/142,392 filed 5 Jan. 2009.

FIELD AND BACKGROUND OF THE INVENTION

Various methods and systems for securing data transport in communication networks and in particular for securing data transport in an Ethernet on Passive Optical access Network (EPON) are possible. Methods and systems may improve on standard security standards, for example MACsec (Medium Access Control security) standards as put forth in the IEEE 802.1AE and 802.1af of standards documentation published in 2006 by The Institute of Electrical and Electronics Engineers, Inc., 3 Park Avenue, New York, N.Y. 10016-5997, USA.

Illustrated in FIG. 1 is an example of an EPON 10. EPON 10 includes an Optical Line Terminal (OLT 12), which coordinates communication in EPON 10 over a single, shared optical trunk fiber 15. Inexpensive optical splitters 18a and 18b divide trunk fiber 15 into separate strands (branch fibers 16a, 16b, 16c, 16d, 16e, 16f and 16g) which feed individual N=6 Optical Network Units (ONUs) 14a, 14b, 14c, 14d, 14e and 14f which are the subscribers to the network. EPON 10 is called "passive" because the active components of the network are associated with end points (OLT 12 and ONUs 14a-f), and EPON 10 does not require active electronics within the access network.

EPON 10 uses N+1 optical transceivers (OT) 22a, 22b, 22c, 22d, 22e, 22f, 22g. EPON 10 requires no electrical power in the field. The drop throughput can be up to the line rate on the trunk link. EPON 10 can support downstream (from OLT 12 to multiple ONUs 14a-f) broadcast such as video.

EPON 10 is based on the Ethernet standard. Ethernet standards enable the economies-of-scale and provide simple, easy-to-manage connectivity to Ethernet-based equipment, both at the customer premises and at the central office. As with other Gigabit Ethernet and 10 Gigabit Ethernet media, it is well-suited to carry packetized traffic, which is dominant at the access layer, as well as time-sensitive voice and video traffic.

EPON 10 is configured in full duplex mode (since all communication is coordinated by the OLT, there is no need for crash detection and mediation CD/CSMA) in a single fiber point-to-multipoint (P2MP) topology. All subscribers (ONUs 14a-f), see all downstream (DS) traffic from OLT 12. Upstream (US) traffic (for example from ONU 14a) to OLT 12 is not to be seen by other subscribers (in the example ONUs 14b-f), and peer-to-peer communication is done through the OLT 12. OLT 12 allows only one subscriber at a time to transmit using a Time Division Multiplex Access (TDMA) protocol. Upstream and downstream traffic are transmitted at the same time using Wave Division Multiplexing (WDM).

EPON 10 introduces a security challenge because DS data is broadcasted and exposed to all ONUs (14a-f). This creates a possibility of data snooping. Also Upstream (US) a hostile body (for example a rogue ONU) can forge packets and masquerade as a different ONU. Upstream data may also be considered not confident as there is low reflected light power coming back at optical splitters 18a and 18b which might be snooped with the right equipment. Therefore a security scheme for EPON which is based on encryption of the data and authentication of the data is important. The IEEE 802.1 standard defined a (layer 2) L2 security model and authentication mechanism in two specifications-802.1ae and 802.1af.

The IEEE 802.3ah for Gigabit EPON and IEEE 802.3av for 10 Gigabit EPON specifications define a Multi-Point Control Protocol (MPCP) and a Point-to-Point Emulation (P2PE) necessary to build an EPON system. Industry standard protocols are reviewed by security experts and enable worldwide interoperability. IEEE 802.1ae and 802.1af are standardized security solutions for L2, meaning they provide security to the data transported in an L2 EPON by the following means: Packet content is encrypted—starting from Ethernet header, and a message digest is appended. An AES-GCM encryption and authentication algorithm is used to encrypt and to authenticate the payload. An 128 bit key is used to do the encryption. Key negotiation between the ONU and OLT is done through the 802.1af key exchange protocol. The security scheme allows both downstream and upstream encryption. The security standard allows handling of multicast traffic in a separate encrypted manner, by separation of the groups in different keys and by allowing a handling of the specific single copy broadcast (SCB) traffic of the EPON in a separate key. The security standard also allows having a few security offsets exposing the desired portion of the packet. The standard allows use of predefined values of offsets. The smallest offset which does not cover entirely the packet is 30 bytes, which exposes all data of the Ethernet header.

The current standards, as described above and in the IEEE 802.1ae and 802.1af specifications lack security features that are desirable in an EPON environment. For example, according to current security protocols, MPCP messages cannot be encrypted this leads to possible security breaches, for example a hostile body can intercept the gate packets to a particular ONU and jam upstream traffic from the ONU. Another source of security breaches in the current standards is the limitation of offset values, which do not allow encryption of the standard Ethernet header and MAC address when an offset is in use. Thus, it is possible for a hostile body to identify a user by his MAC address, monitor the header information of the packet data and perform traffic analysis. A further source of a security breaches under the current standards are auto discovery gate packets and registration requests and register packets messages that are not encrypted and therefore a hostile body can jam an ONU through false registration/deregistration requests. Another disadvantage of the current MACsec standards is that an encrypted packet must have a full long MACsec header requiring increased bandwidth for all traffic inside the EPON.

There is thus a widely recognized need for, and it would be highly advantageous to have improved security measures for securing data on an EPON network and particularly for protecting upstream and downstream data, for preventing hostile identification and jamming of particular ONUs, and for reducing bandwidth of encrypted messages.

SUMMARY OF THE INVENTION

Various methods and systems are possible for securing an EPON network. Particularly, a system or method may encrypt local packets using a short MACsec header and encrypt OAM and MPCP packets.

An embodiment of a method of securing communication on an EPON having an OLT and a multiple ONUs may include the steps of encrypting a first type packet with a first short MACsec header and a first pre-determined SAK. The first type packet may be transmitted over the EPON from the OLT to an ONU of the plurality of ONUs. The method may also include the step of transmitting from the OLT to the same ONU a second type packet with a second short MACsec header. The second type packet may be encrypted with a second pre-determined SAK.

In an embodiment of a method of securing communication on an EPON the first type packet may be a UC packet and the second type packet may be a default target MC packet and the second pre-determined SAK may be a pre-shared SAK.

In an embodiment of a method of securing communication on an EPON the first type packet may be a DS packet directed to an ONU of the plurality of ONUs and the SCI.PI of the first type packet may be an LLID of the ONU.

In an embodiment of a method of securing communication on an EPON the encrypting of the first type packet may be in a tunnel mode.

In an embodiment of a method of securing communication on an EPON the first type packet may be an OAM packet.

In an embodiment of a method of securing communication on an EPON the second type packet may be a MPCP packet.

An embodiment of a method of securing communication on an EPON may also include the step of sending an encrypted registration request packet from an ONU of the plurality of ONUs to the OLT.

An embodiment of a method of securing communication on an EPON may also include the step of including a random PN in the encrypted registration request packet.

An embodiment of a method of securing communication on an EPON may also include the step of addressing the encrypted registration request packet with a dummy SA.

An embodiment of a method of securing communication on an EPON may also include the step of the OLT discarding a registration request packet when the ONU sending the registration message is active.

An embodiment of a method of securing communication on an EPON may also include the step of adding a security offset having a length of less than 30 bytes to the first type packet.

An embodiment of a method of securing communication on an EPON may also include the step of sending a MACsec encrypted discovery gate packet from the OLT to the plurality of ONUs.

In an embodiment of a method of securing communication on an EPON the encrypting of the first type packet may include setting the SCI.SA of the first type packet to the SA of the OLT.

In an embodiment of a method of securing communication on an EPON the encrypting of the first type packet may include setting the MSB of a SCI.SA of the first type packet to differentiate between an US packet and a DS packet.

An embodiment of a decryption engine for use by an ONU on an EPON coordinated by an OLT may include a DecPars module configured to extract a first pre-determined SCI from a first type short MACsec header packet sent from the OLT. The DecPars module may be further configured to extract a second pre-determined SCI from a second type short MACsec header packet sent from the OLT to the ONU. The decryption engine may also include a KDB configured to fetch a first SAK corresponding to the first pre-determined SCI. The KDB may also be configured to fetch a second SAK corresponding to the second pre-determined SCI.

In an embodiment of a decryption engine for use by an ONU on an EPON coordinated by an OLT, the DecPars module may be further configured to parse a tunnel mode packet sent from the OLT to the ONU.

An embodiment of a decryption engine for use by an ONU on an EPON coordinated by an OLT may also include a FRB module configured to discard a packet with an incorrect PN.

In an embodiment of a decryption engine for use by an ONU on an EPON coordinated by an OLT, the KDB may be further configured to store a pre-shared SAK for a MPCP message.

In an embodiment of a decryption engine for use by an ONU on an EPON coordinated by an OLT, the DecPars module may be further configured to parse a packet having a security offset of less than 30 bytes.

An embodiment of a decryption engine for use by an OLT on an EPON having a plurality of ONUs, may include a DecPars module configured to extract a first pre-determined SCI from a first type short MACsec header packet sent to the OLT from an ONU of the plurality of ONUs. The DecPars module may also be configured to extract a second pre-determined SCI from a second type short MACsec header packet sent from the ONU to the OLT. The decryption engine may also include a KDB configured to fetch a first SAK corresponding to the first pre-determined SCI and the KDB may also be configured to fetch a second SAK corresponding to the second pre-determined SCI.

In an embodiment of a decryption engine for use by an OLT on an EPON, the DecPars module may be further configured to parse a tunnel mode packet sent from the ONU to the OLT.

An embodiment of a decryption engine for use by an OLT on an EPON may further include a FRB module configured to discard a packet having a PN that is out of sequence.

An embodiment of a decryption engine for use by an OLT on an EPON may further include a FRB module configured to discard a packet having a previously used PN.

In an embodiment of a decryption engine for use by an OLT on an EPON, the KDB may be further configured to store a pre-shared SAK for decrypting a registration request message.

In an embodiment of a decryption engine for use by an OLT on an EPON, the DecPars module may be further configured parse a packet having a security offset that is less than 30 bytes.

An embodiment of a secure EPON may include an OLT configured to encrypt a first type packet with a short MACsec header using first pre-determined SAK. The OLT may be further configured to encrypt a second type packet with a short MACsec header using second pre-determined SAK. The secure EPON may further include an ONU configured to decrypt the first type packet, and the second type packet.

In an embodiment of a secure EPON the first type packet may be a UC packet and said second type packet may be a default target MC packet.

In an embodiment of a secure EPON the OLT may be further configured to encrypt a packet in tunnel mode using a dummy MAC address.

In an embodiment of a secure EPON the OLT may be further configured to encrypt a MPCP packet.

In an embodiment of a secure EPON the ONU may be further configured to send an encrypted registration request packet using a pre-shared SAK.

In an embodiment of a secure EPON the ONU may be further configured to include a random PN in the encrypted registration request packet.

In an embodiment of a secure EPON the ONU may be further configured to send the encrypted registration request packet with a dummy MAC address.

In an embodiment of a secure EPON the OLT may be further configured to refuse a registration request packet of sent from the ONU when the ONU is active.

Terminology

The following terms are used in this application in accordance with their plain meanings, which are understood to be known to those of skill in the pertinent art(s). However, for the sake of further clarification in view of the subject matter of this application, the following explanations, elaborations and exemplifications are given as to how these terms may be used or applied herein. It is to be understood that the below explanations, elaborations and exemplifications are to be taken as exemplary or representative and are not to be taken as exclusive or limiting. Rather, the terms discussed below are to be construed as broadly as possible, consistent with their ordinary meanings and the below discussion.

CMSA/CD—Carrier Sense Multiple Access with Collision Detection
DoS—Denial of Service
DS—downstream (from the OLT to at least one ONU)
Encrypted—encrypted using MACSec (possibly including various options described).
EPON—Ethernet Passive Optical Network
ES—End Station
FIFO—First In First Out
FRB—Frame ReBuilder
Gate packet—a DS packet sent to announce a time slot. A gate packet may be addressed to an individual ONU (for example for assigning a time slot for the individual ONU to transmit a packet) or a gate packet may be an MC broadcast (for example a discovery gate packet that is sent to all ONUs to announce availability of a discovery time slot)
ICV—Integrity Check Value
KDB—Key Data Base
LAN—Local Area Network
LLID—Logical Link Identification
Local packet—a packet sent from one endpoint in an EPON to another endpoint in the same EPON.
MAC—Media Access Control
MACsec—Media Access Control security
MC—MultiCast (a single message intended for a multiple recipients)
MPCP—Multi Point Control Protocol
MSB—Most Significant Bit
OAM—Operations, Administration and Maintenance
OLT—Optical Line Terminal
ONU—Optical Network Unit
OT—Optical Transceiver
PI—Port Identifier
SA—Secure Association
SAK—Secure Association Key
SC—Secure Channel
SCB—Single Copy Broadcast
SCI—Secure Channel Identifier
TDMA—Time Domain Multiple Access
Time slot—A time period granted by an OLT for a particular US transmission—for example a time slot may be assigned to an individual ONU for sending a packet or a time slot may be a discovery time slot wherein any unregistered ONU may send a registration request.
UC—UniCast (a single message intended for a single recipient)
US—Upstream (from a ONU to the OLT)
WDM—Wave Division Multiplexing

BRIEF DESCRIPTION OF THE DRAWINGS

Various embodiments of a method and system for protection of security on an EPON network are herein described, by way of example only, with reference to the accompanying drawings, where:

FIG. 4b is an illustration of the coding of a packet having a short MACsec header.

DESCRIPTION OF THE PREFERRED EMBODIMENTS

The principles and operation of a secure EPON according to various embodiments may be better understood with reference to the drawings and the accompanying description.

Figure 1:
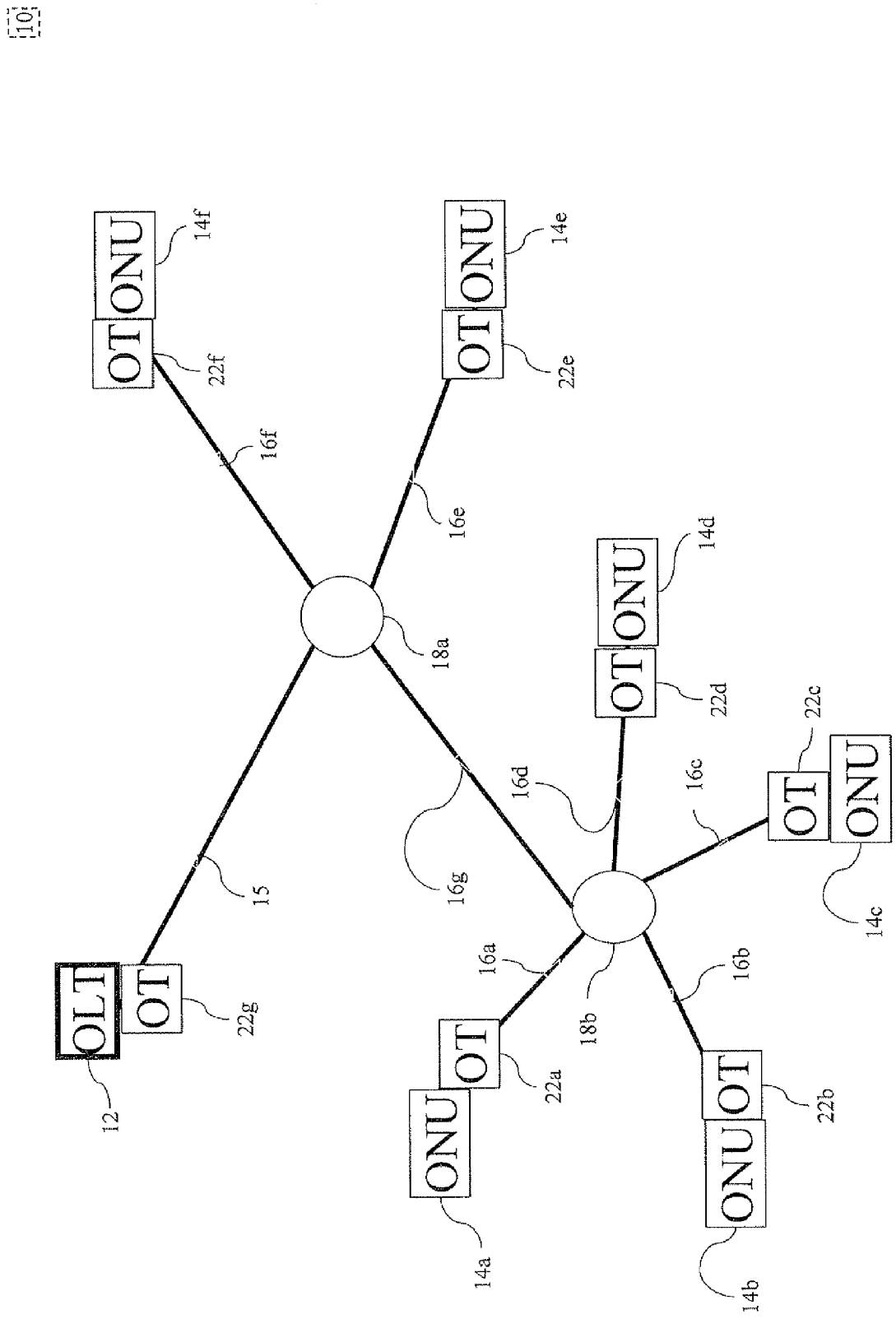
FIG. 1 is an illustration of an embodiment a simplified EPON network.
Figure 2:
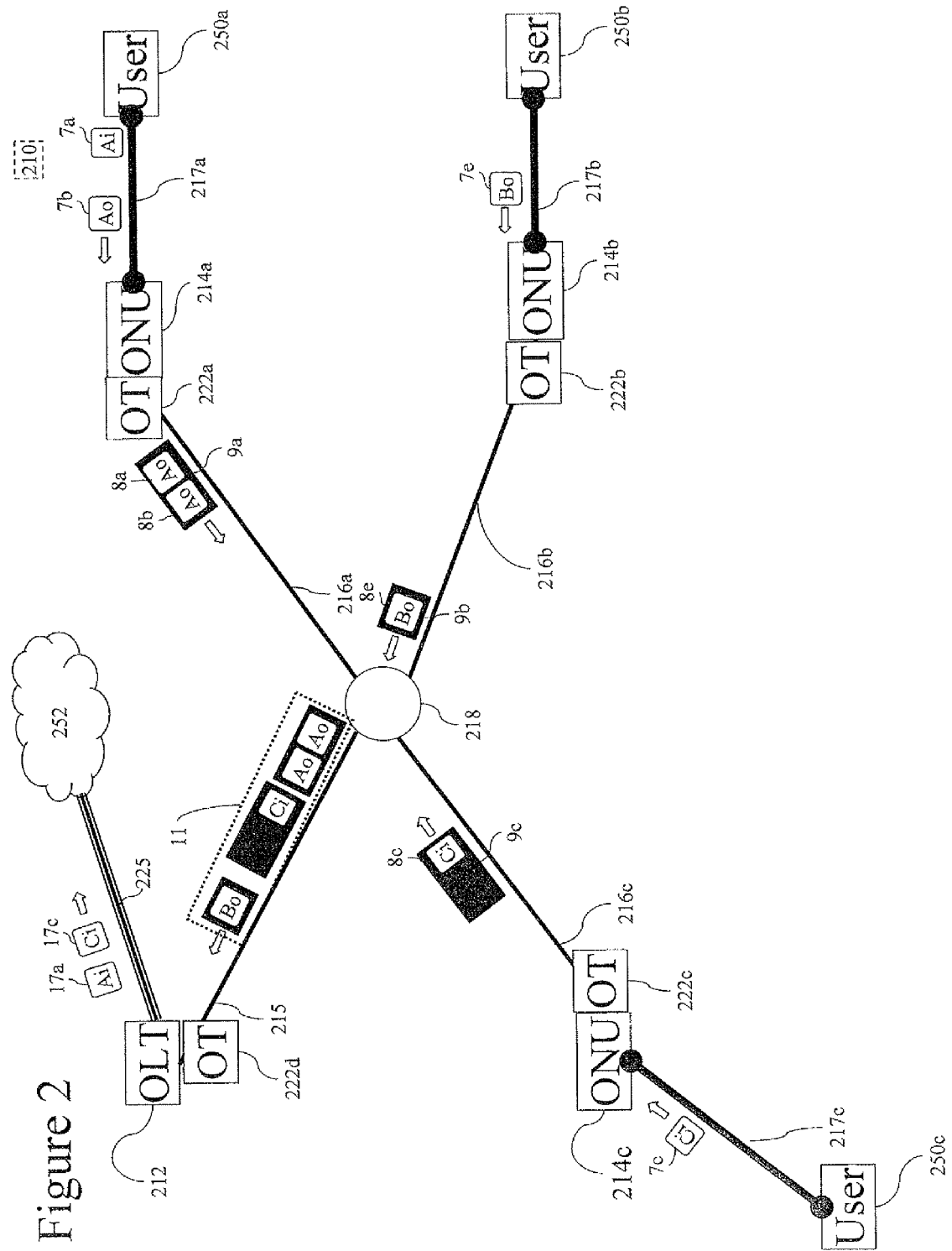
FIG. 2 is an illustration of an example of upstream traffic on a second embodiment of a simplified EPON network.

Referring now to the drawings, FIG. 2 is an illustration of an example of upstream traffic on a second embodiment a simplified EPON 210.

Illustrated in FIG. 2 are 3 users 250a, 250b and 250c. Each user is connected to a respective local area network (LAN) 217a, 217b and 217e. Each LAN 217a-c may include a single or multiple users. Each LAN 217a-c is connected to EPON 210, which includes for each LAN 217a-c a respective ONU 214a, 214b and 214c, OT 222a, 222b and 222c and branch fiber 216a, 216b and 216c. Branch fibers 216a-c connect via an optical splitter 218 to a trunk fiber 215 where all the upstream traffic form a packet train 11 which is received via an OT 222d to OLT 212. OLT 212 (and hence EPON 210) is connected via a link 225 to the Core network 252.

In the example of FIG. 2, a first user, user 250a sends a message 7a to Core network 252. For the sake of illustration in FIG. 2, message 7a is marked with the tag "Ai". The first capital represents the sender ("A" for user 250a) and the later small letter represents the intended recipient ("i" for Core network 252). User 250a also sends a local message 7b to user 250c. Both messages 7a and 7b are sent via LAN 217a to ONU 214a, which encrypts messages 7a and 7b into encrypted packets 8a and 8b respectively. ONU 214a then waits for a previously determined time slot 9a to send packets (8a, b) via OT 222a, branch fiber 216a, optical splitter 218, to packet train 11 on trunk fiber 215 and OT 222d to OLT 212.

On EPON 210 an upstream packet intended for the Core Network 252 may be encrypted in one of three ways: either by sending the un-modified Ethernet packet with a standard Ethernet header and a long SecTAG, or by sending the un-modified. Ethernet packet with a standard Ethernet header and a short SecTAG or by sending the Ethernet packet in tunnel mode with a short SecTAG. Particularly message 7a is encrypted by ONU 14a into tunnel mode packet 8a. On EPON 210 packet 8a is encrypted with a short header. Message 7a including its Ethernet header is encrypted in the payload of packet 8a. Thus, a hostile body snooping reflected messages from optical splitter 218 will not be able to read the standard Ethernet header of message 7a (which for example gives away the MAC address of user 250a).

ONU 214a encrypts message 7b for local P2P transport using a short MACsec header. Use of a short MACsec header reduces packet length and saves bandwidth. The SCI.SA of the short header is the globally known OLT source address which is known to ONUs 214a-c and to OLT 212. The SCI.PI is the Logical Link Identifier LLID of ONU 214a which is given by the OLT to ONU 214a upon registration and is unique per ONU. In order to distinguish the SCI of upstream packets from the SCI of downstream packets using the same OLT MAC source address and the same LLID then for upstream packets the OLT.SA has its MSB value set to '1'. It is assured by Ethernet standard that no MAC address has its MSB set to '1' since this is used for transmitting MC traffic. Because the default SCI for packets sent from ONU 214a to OLT 212 is pre-determined (and already known), the full SecTAG (for example see FIG. 4a) does not need to be explicitly specified in the header of packet 8b, thus the MACsec header of packet 8b is a short MACsec header (for example see FIG. 4b) that does not contain the full secure system secure association (SCI.SA) and Port Identifier (SCI.PI).

Also on EPON 210 a tunnel secured packet has a MACsec header which uses a local MAC destination address instead of the global L2-MAC address of user 250a. Thus the global L2-MAC address of user 250a is not revealed on EPON 210 thus protecting user identity. Also, in the tunnel secured packet, the MACsec header secure association SA field (SCI.SA) is the MAC source address, and the SCI.PI is the Logical Link Identifier LLID which is given by the OLT to an ONU upon registration and is unique per ONU.

ONU 214a set ES=0 SCB=0 and SC=0 (see Table 1) in both packets 8a and 8b, accordingly, OLT 212 recognizes packet 8a and 8b as short MACsec header local upstream (US) (directed to OLT 212) Uni-Cast (UC). Accordingly OLT 212 decrypts packet 8a and recognizes it as a tunnel mode packet containing message 7a for Core network 252. Accordingly, OLT 212 extracts from message 7a an Ethernet packet 17a, which OLT 212 sends over link 225 and Core network 252 to the intended recipient.

OLT 212 recognized packet 8b as a local packet intended for OLT 212. Therefore, OLT 212 decrypts the payload of packet 8b using the pre-determined SCI for upstream messages from ONU 214a recovering message 7b where the SCI.SA equals to the OLT MAC address with the MSB set to '1', the SCI.PI equals to the ONU Logical Link Identifier (LLID) which is given at the packet preamble. For example message 7b is a request for bandwidth. The decision of using tunnel mode or not may be a global decision for a whole stream: upstream or downstream. The examples given here of using both tunnel and non tunnel do not imply that both kinds can be transmitted consecutively.

By using the OLT MAC address as the SCI.SA field and the Logical Link Identifier (LLID) as the SCI.PI field and differing upstream and downstream SCI by setting the MSB of the SCI to '1' only in one direction it is possible to use a short SecTAG for all secured traffic between an ONU to OLT and for all secured traffic between OLT to an ONU. Also by using a tunnel mode within 802.1AE it is possible to secure the MAC address. The combination of hiding the MAC address in tunnel mode and the idea of using a short SecTAG by an implied SCI.SA which is equal to the tunneled source address field and by an implied Logical Link Identifier (LLID) as the SCI.PI field allows short tunnel secure messages to save bandwidth while protecting the identifications of members of the EPON.

In the example of FIG. 2, a second ONU 214b has not yet registered onto EPON 210. Therefore ONU 214b sends a register request message 7e. ONU 214b encrypts register request message 7e and adds a short MACsec header with ES=0 SCB=0 and SC=0 (see Table 1) using a pre-determined and pre-shared that is used by all ONUs 214a-c for registration request messages and a dummy MAC address that is reserved for registration request messages. The resulting registration request packet 8e is transmitted to OLT 212 along branch fiber 216b optical splitter 218 and trunk fiber 215 during a shared discovery time slot 9b. Because registration request packet 8e is encrypted and is in tunnel mode, a hostile body will not be able to determine who is registering, and the hostile body will not be able to produce a counterfeit registration request packet. Furthermore, the register request packet 8e is secured by a pre shared SAK. Therefore, if a hostile body which does not know the pre shared SAK cannot register to the system. Also, on EPON 210 DS MC MPCP messages are encrypted with a SCI and a SAK shared by all ONUs 214a-c. Thus the discovery gate packet from OLT 212 announcing discovery time slot 9b is sent out encrypted and only a legitimate ONU (such as ONUs 214a-c) having the proper SCI and SAK can decipher the MCPC discovery gate packet and know the discovery time slot 9b. This encryption of MCPC messages and particularly encryption of discovery gate packets makes it difficult for a hostile body to detect or jam the discovery process. Furthermore, it is possible for a service provider to pre-program a ONU with the discovery SAK and SCI. This would mean that only preprogrammed ONUs acquired from the service provider would work on the network thus protecting the integrity of the network and giving profit to the service provide who controls the selling of ONUs.

Also in FIG. 2 a third user, user 250c sends a message 7c to a Core network 252 destination. Message 7c is already an encrypted packet and will remain encrypted as it passes OLT 212. Therefore ONU 214c decrypts the packet and sets bits ES=1, SCB=0 and SC=0 (see table 1) on the existing Ethernet header in order to allow a short SecTAG where the source address is used as the SCI.SA. ONU 214c sends the modified message 7c as packet 8c during time slot 9c to OLT 212. OLT 212 recognizes packet 8c as an Ethernet packet and sends the entire packet as an Ethernet packet 17c to Core network 252 to be delivered to the intended recipient. However, due to lack of resources for handling the large number of users and source addresses (each user has its own source address) on EPON 210 ONU 214c may choose to secure the packet using a long SecTAG and an explicit SCI in the SecTAG field.

Figure 3:
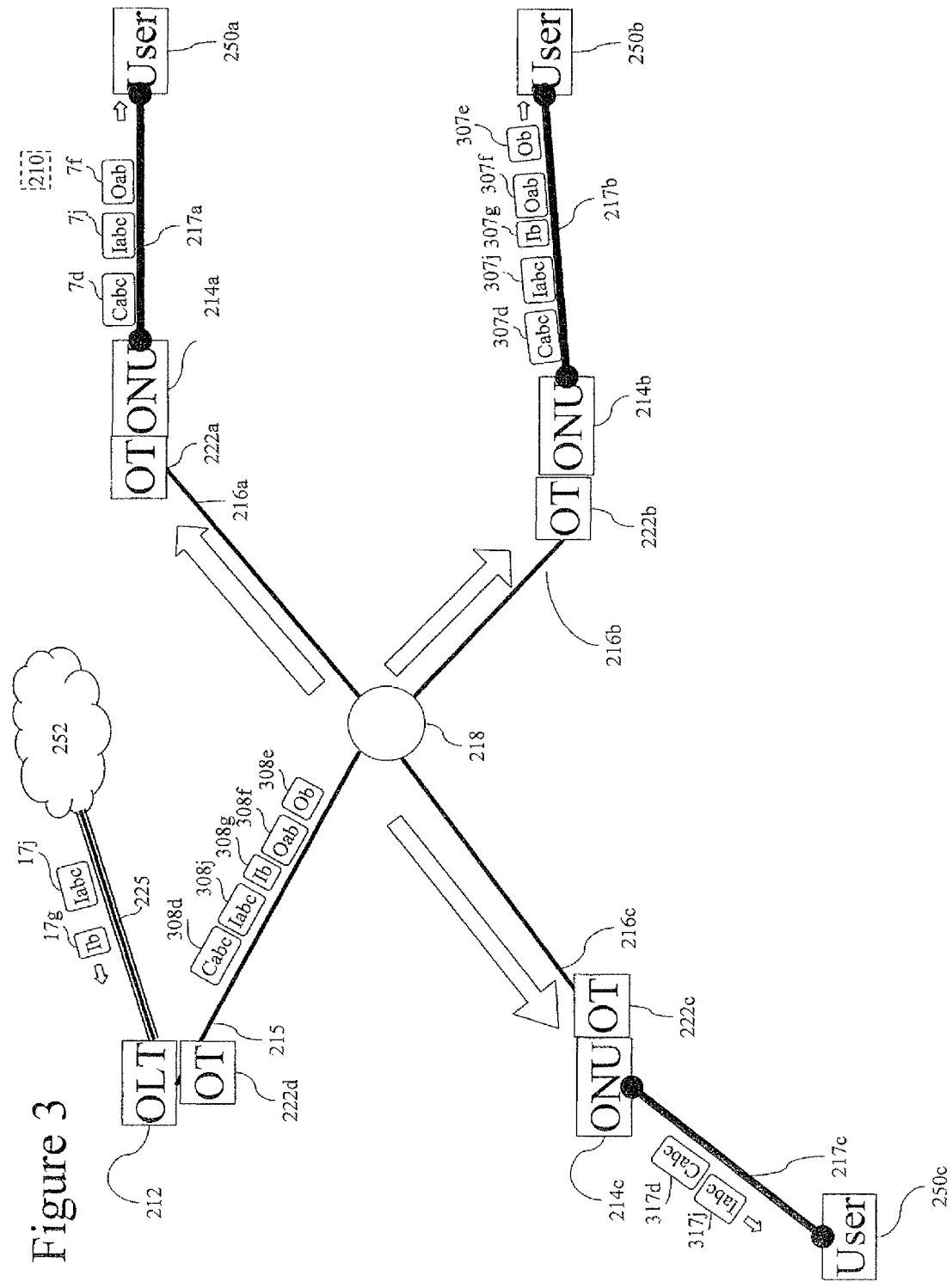
FIG. 3 is an illustration of an example of downstream traffic on the second embodiment of a simplified EPON network.

FIG. 3 depicts downstream traffic at a time subsequent to the time of the example of FIG. 2. Along with the US traffic depicted in FIG. 2, OLT 212 has also received packets 17g and 17j from Core network 252.

Packet 17g is a standard Ethernet UC short secured packet. Recognizing that packet 17g is already addressed and encrypted, OLT 252 does not attempt to decrypt packet 17g but merely sets keys ES=1, SCB=0 and SC=0 (see table 1) in packet 17g resulting in packet 308g. The ES, SCB and SC setting inform ONUs 214a-c that packet 308g is a standard short Ethernet UC packet. OLT 212 sends packet 308g over trunk fiber 215 and on to all ONUs 214a-c.

All downstream packets (308d, 308e, 308f, 308g, and 308j) are transported down trunk fiber 215 to optical splitter 218 and travel down all branch fibers 217a-e to all ONUs 214a-c via their respective OTs (222a-c). Thus packet 308g arrives to all ONUs 214a-c. Packet 308g is discarded by ONUs 214a and 214c. Packet 308g is received by ONU 314b and decrypted and the unencrypted data 307g is sent along LAN 217b to user 250b.

Packet 17j is a standard long MACsec header Ethernet packet addressed to users 250a-e. Since packet 17j is already encrypted and addressed, EPON 212 sets keys ES=0, SCB=0 and SC=1 (see table 1) to notify ONUs 214a-c that the resulting packet 308j uses standard Ethernet addressing and sends packet 308j downstream. According to the addressing, all ONUs 214a-c receive packet 308j and decrypt the payload to messages 7j, 307j and 317j each of which is sent on a respective LAN 217a-e to a respective user 250a-c.

In order to recognize new ONUs, OLT 212 sends a secured discovery gate packet with a pre-known SCI and a pre-known SAK. Thus, non authorized ONUs will not recognize the discovery gate packets and will be able to register.

In response to registration packet 8e (see illustrated in FIG. 2) OLT 212 sends a register packet 308e to user 250b. UC Network instructions (for example OAM messages gate and registration information and MPCP messages) are sent from OLT 212 to the recipient ONU (for example ONU 214b) in a local short DS MACsec packet (for example packet 308e). Local short UC DS MACsec packets (for example packet 308e) are marked by setting keys ES=0, SCB=0 and SC=0 (see table 1). A separate default SCI is stored by OLT 212 for each ONU 214a-c. Thus, short packet ONU 214b is encoded using the default SCI of ONU 214b and cannot be decrypted by a hostile body or another ONU (for example ONU 214a or ONU 214c). The SCI is built from two fields: the SCI.SA equals to the OLT MAC address with the MSB set to '0' and the SCI.PI equals to the ONU Logical Link Identifier (LLID) which is given at the packet preamble. ONU 214b receives packet 308e and decrypts the payload (message 307e) and sends messages 307e to user 250b over LAN 217b.

OLT 212 also sends a short MACsec DS MC packet 308d. Short MACsec DS MC packets (for example packet 308d) are marked setting keys ES=0, SCB=1 and SC=0 (see table 1) and encrypted with SCI that is known to all ONUs 214a-c. The SCI is built from two fields: the SCI.SA equals to the OLT MAC address with the MSB set to '0' and the SCI.PI equals to the 0xFFF. According to the addressing packet 308d is received by ONU 214a-e and the payload is decrypted and sent messages 7d, 307d and 317d to users 250a-c respectively. Similarly an MPCP MC message to all ONUs 214a-c would be encrypted with the preshared SCI and bits ES=0, SCB=1 and SC=0 similar to packet 308d.

OLT 212 also sends a custom target MC packet 308l to users 250a-b. On EPON 210 a custom target MC packet (for example packet 308l) is sent with a long MACsec header specifying the source and target addresses according to Ethernet standards and setting keys ES=0, SCB=0 and SC=1 (see table 1). Packet 308f is discarded by ONU 214c and packet 308l is received by ONUs 214a and 214c, which decrypt the payload and send its contents to users 250a-c over LANs 217a-b as messages 7f and 307l respectively.

The encryption and authentication scheme of the IEEE 802.1ae standard adds 32 bytes to the packet for a long header where the SCI is exposed and adds 24 bytes for a short header where the SCI is not exposed. As described above, in EPON 210 a short header is used for the local EPON traffic between each ONU 214a-c and OLT 212 using a pre-determined SCI which is associated with the LLID and using an pre-determined and pre-shared SCI for MC messages broadcast to the default group (all ONUs 214a-c). MC messages are flagged with the SCB indication (SCB=1) to differentiate them from UC messages (flagged with SCB=0). In EPON 210, a long header is used for a remote security association with a remote server or for separating multicast groups.

Key settings for various message types on EPON 210 are shown in Table 1.

TABLE 1

| Direction | Packet type | ES | SCB | SC | SCI.SA | SCI.PI |
|---|---|---|---|---|---|---|
| DS | UC local short secured packet | 0 | 0 | 0 | OLT.SA | ONU.LLID |
| DS | MC local Short secured packet | 0 | 1 | 0 | OLT.SA | 0xFFF |
| DS | Long secured packet | 0 | 0 | 1 | Explicit in SecTAG | Explicit in SecTAG |
| DS | Non-local Short secured UC packet | 1 | 0 | 0 | Packet.SA | 00-01 |
| DS | Non-local short secured MC packet | 1 | 1 | 0 | Packet.SA | 00-00 |
| US | Local UC short secured packet | 0 | 0 | 0 | OLT.SA MSB = 1 | ONU.LLID |
| US | Long secured packet | 0 | 0 | 1 | Explicit in SecTAG | Explicit in SecTAG |
| US | Non-local Short secured packet | 1 | 0 | 0 | Packet.SA | 00-01 |

Key settings:
End Station (ES),
Single Copy Broadcast (SCB),
Sec Tag (SC),
Secure System Secure association (SCI.SA) and
Subscriber Controlled Input Port Identifier (PI) for various packet types for upstream (US) and Downstream (DS) packets.

Figure 4A:
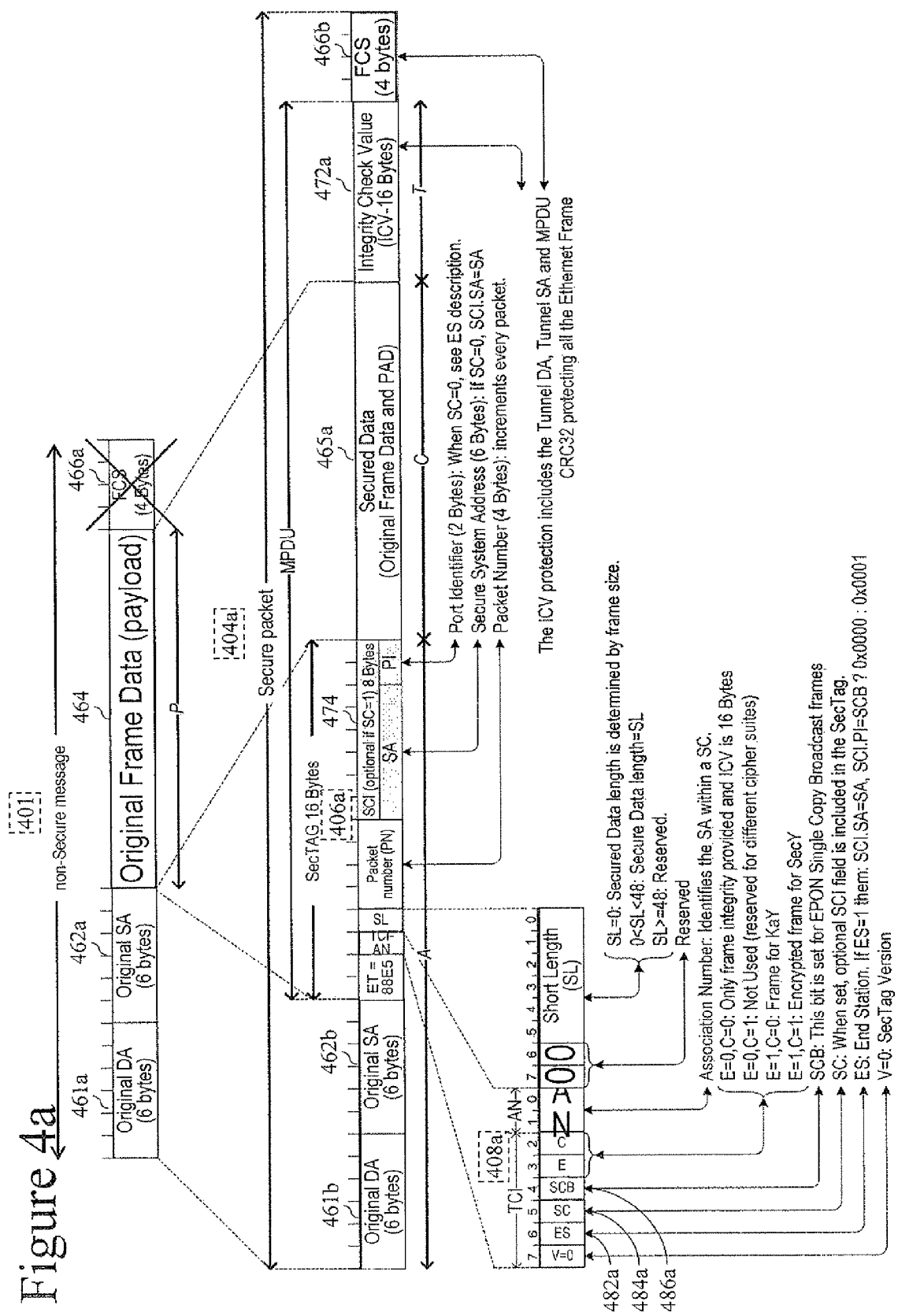
FIG. 4A is an illustration of the coding of a packet having a long MACsec header.

FIG. 4a illustrates structure of a secure data packet 404a having a long SecTAG 406a. A non-secured message 401 includes a destination address 461a, a sending address 462a, non-secure data 464 and a Frame Check Sequence (FCS) 466a for integrity checking.

Message 401 is transformed into secure data packet 404a. Secure data packet 404a includes the original destination address 461b and sending address 462b. Secure data packet 404a also includes non-secure data 464 securely encrypted into secure data 465a. The original integrity check FCS 466a of non-secured message 401 is discarded and a new integrity check FCS 466b and integrity check value ICY 472a are added. Also added is a Security Tag (SecTAG 406a) containing information necessary for authentication. Secure data packet 404a has a long SecTAG 406a which contains an explicit SCI 474.

Secure data packet 404a also includes a TCI-AN 408a byte, the bits of which act as flags for various packet modes. Particularly settings for bits ES 482a, SC 484a and SCB 486a are set according to Table 1.

FIG. 4b illustrates structure of a secure data packet 404b having a short SecTAG 406b. A non-secured message 401 includes a destination address 461a, a sending address 462a, non-secure data 464 and a Frame Check Sequence (FCS) 466a for integrity checking.

Message 401 is transformed into short secure data packet 404b. Short secure data packet 404b includes the original destination address 461c and sending address 462c. Short secure data packet 404b also includes non-secure data 464 securely encrypted into secure data 465b. The original integrity check FCS 466a of non-secured message 401 is discarded and a new integrity check FCS 466c and integrity check value ICY 472b are added. Also added is a short Security Tag (SecTAG 406b) containing information necessary for authentication.

Short secure data packet 404b also includes a TCI-AN 408b byte, the bits of which act as flags for various packet modes. Particularly settings for bits ES 482b, SC 484b and SCB 486b are set according to Table 1.

Figure 5:
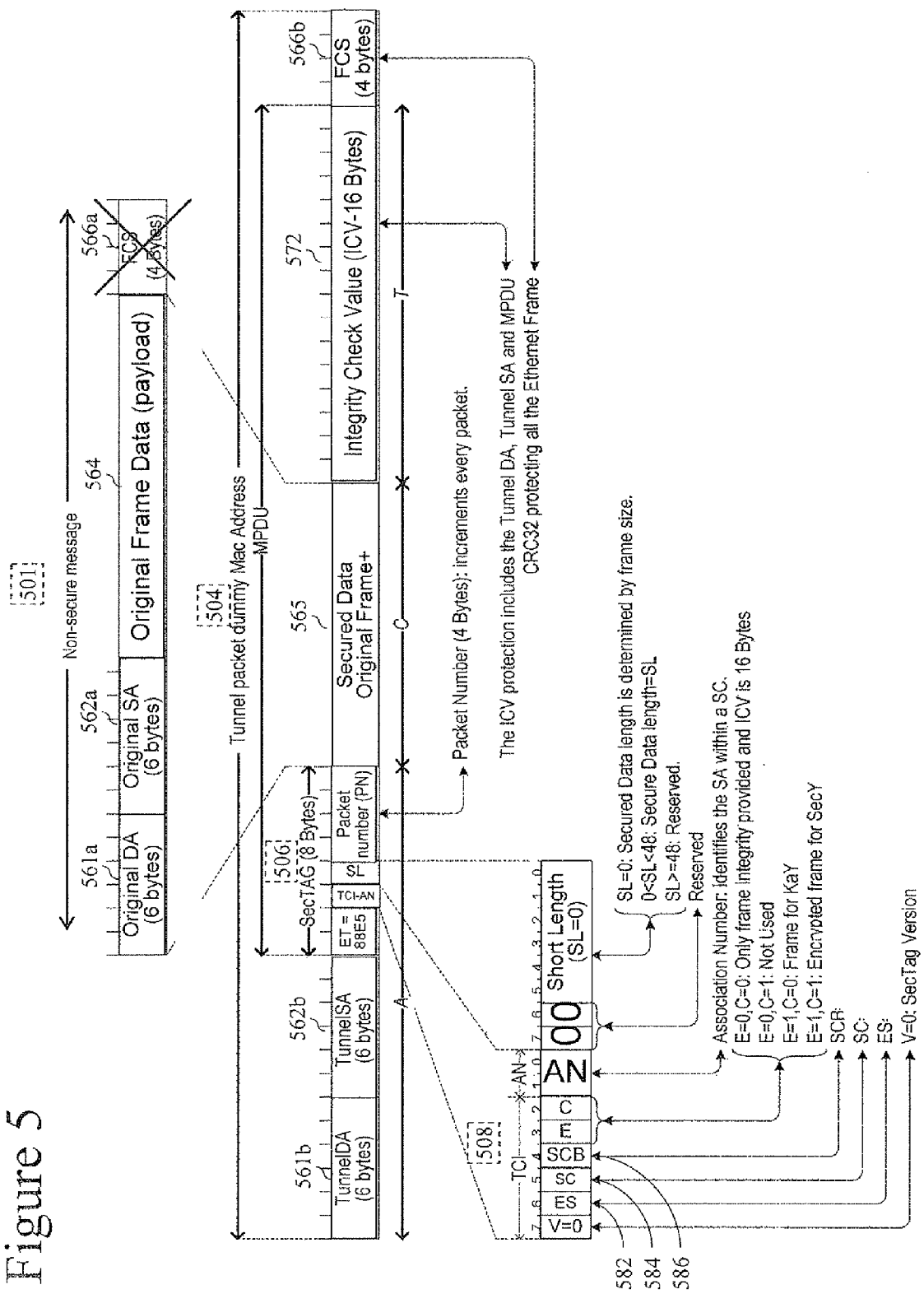
FIG. 5 is an illustration of the coding of a tunnel mode packet having a short MACsec header.

FIG. 5 illustrates structure of a tunnel packet 504. A non-secured message 501 includes a real L2-MAC destination address DA 561a, a real L2-MAC sending address SA 562a, non-secure data 564 and a FCS 566a for integrity checking.

Message 501 is transformed into secure data packet 504. Secure data packet 504 includes a new dummy destination address 561b and new dummy sending address 562b. In secure tunnel packet 504 non-secure data 564 as well as real L2-MAC destination address 561a, a real L2-MAC sending address 562a are securely encrypted into secure data 565. The original integrity check FCS 566a of non-secured message 501 is discarded and new integrity check FCS 566b and ICY 572 are added. Because tunnel packet 504 has a field for dummy sending address 562b, which can be used as the SCI.SA and with the Logical Link Identifier (LLID) used as the SCI.PI a short SecTAG 506 is used since there is no need to include an explicit SU.

Tunnel packet 504 also includes a short SecTAG 506 containing a TCI-AN 508 byte, the bits of which act as flags for various packet modes. Particularly settings for bits ES 582, SC 584 and SCB 586 are defined in Table 1.

Figure 6:
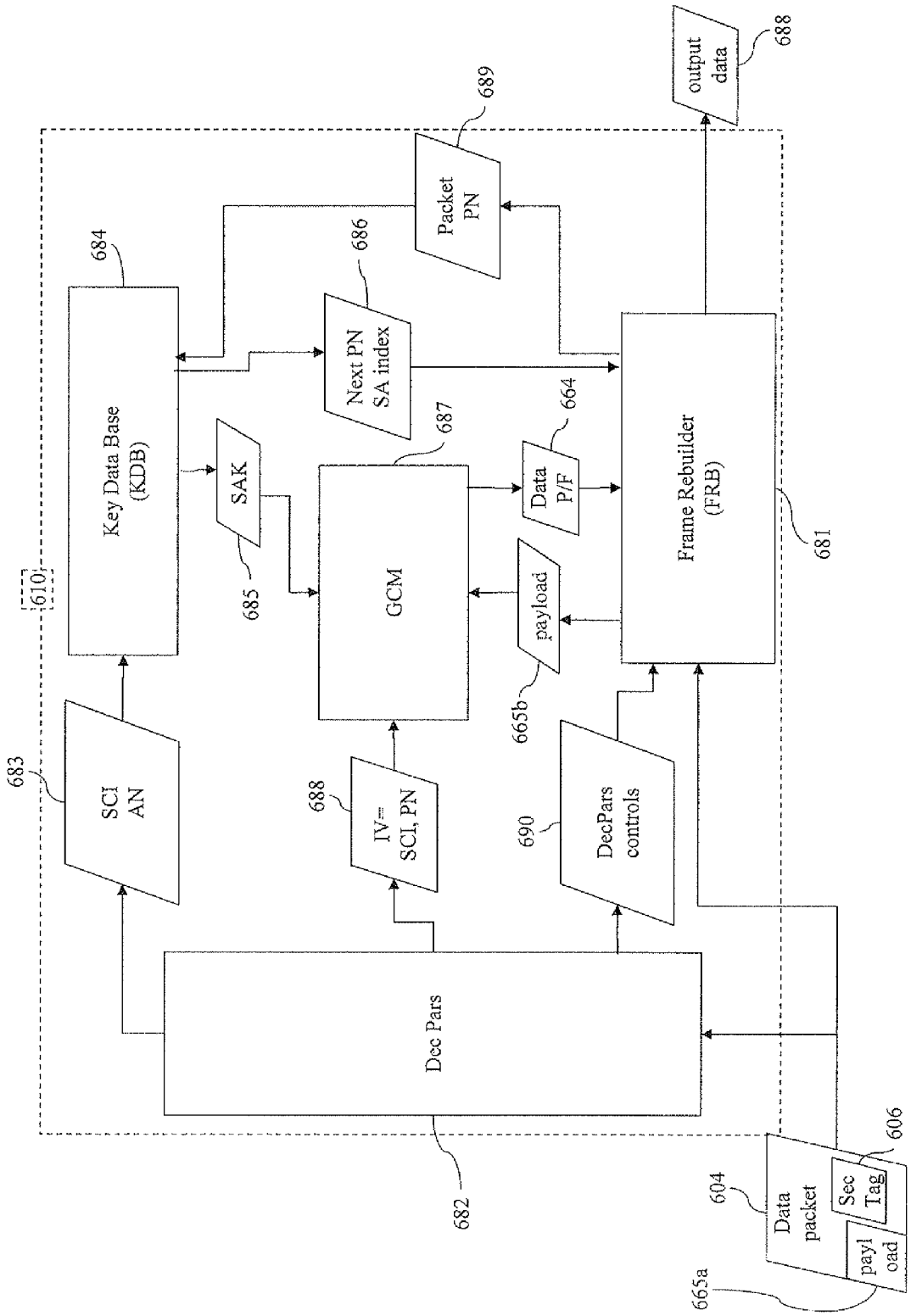
FIG. 6 is an illustration of an embodiment of a Decoder for secured data packets on an EPON network.

FIG. 6 is a block diagram illustrating an embodiment of a decryption engine 610.

A data packet 604 including a SecTAG 606 and a secure data 665a enters decryption engine 610 and is pushed to a frame rebuilder FRB 681 and to a DecPars 682.

FRB 681 is the main data-path pipeline. FRB 681 passes secure data 665a now cleaned as secure data 665b via a First in First Out FIFO based pipeline.

DecPars 682 extracts a SecTAG 606 from packet 604 (for example see SecTAG 406a of FIG. 4a). Using SecTAG 606, DecPars 682 takes decisions about the packet such as: discard, bypass the security and how to extract an association number SCI.AN 683. For example, in ONU 214a DecPars 682 determines the SecTAG type: long SecTAG, short SecTAG according to ES, SC, and SCB bit values as described for DS packets in table 1, thus revealing the SCI and determines the SCI.AN 683. Alternatively, if DecPars 682 is in OLT 212 then DecPars 682 determines the SecTAG type: long SecTAG, short SecTAG according to ES, SC, and SCB bit values as described for US packets in table 1, thus revealing the SCI and determines the SCI.AN 683. Once SCI.AN 683 is found it is sent to a Key Data Base KDB 684. KDB 684 seeks the SCI.AN 683 value in a table and fetches the corresponding Secure association Key SAK 685 and the nextPN 686.

A Galois/Counter Mode cipher/decipher/authenticate module GCM-AES-128 (GCM 687) is fed with the SAK 685 from KDB 684 and with the SCI.PN(IV) 688 from DecPars 682 and encrypted secure data 665b. After decrypting it outputs decrypted data 664 including the plaintext packet (if the packet was encrypted) and a PASS/FAIL indication.

When decrypted data 664 are successfully outputted from the FRB 681 pipeline a nextPN 689 is updated (according to rules of the DecPars controls 690 associated with data packet 604) and statistics counters are increment (using output pulses to an external statistics block). The FRB 681 also rebuilds packets: without the SecTAG and without the ICV.

Figure 7:
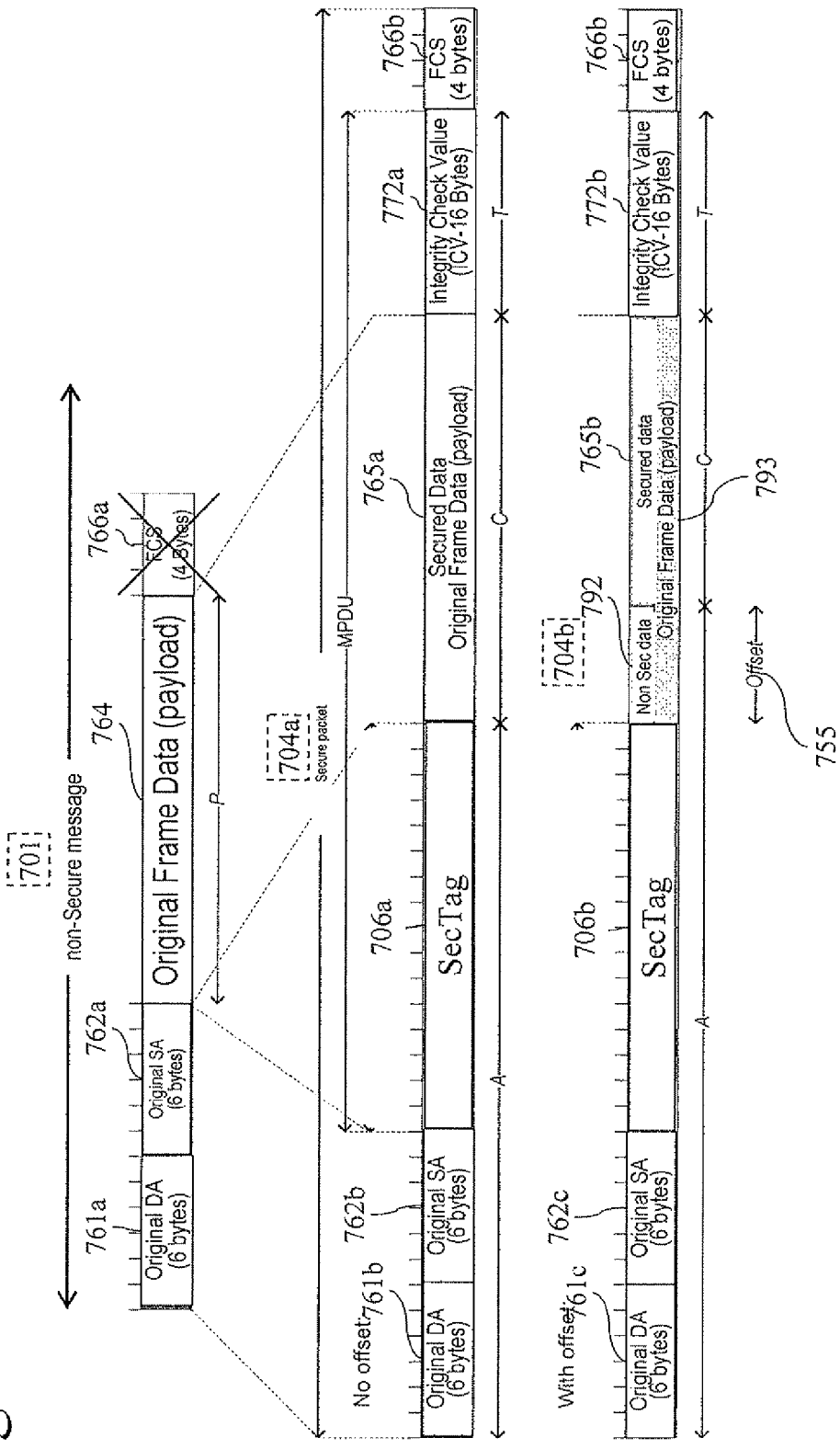
FIG. 7 is an illustration comparing a packet without security offset to a packet with security offset.

FIG. 7 illustrates a security offset 755. A non-secured message 701 includes a destination address 761a, a sending address 762a, non-secure data 764 and a Frame Check Sequence (FCS) 766a for integrity checking.

Message 701 is transformed into secure data packet 704a. Secure data packet 704a includes the original destination address 761b and sending address 762b. Secure data packet 704a also includes the non-secure data 764 securely encrypted into secure data 765a. The original integrity check FCS 766a of non-secured message 701 is discarded and new integrity check FCS 766b and ICV 772a are added. Also added is a Security Tag (SecTAG 706a) containing information necessary for decryption.

Alternatively message 701 may be transformed into secure data packet 704b with a security offset 755. Like secure data packet 704a, secure data packet 704b includes the original destination address 761c and sending address 762c. Secure data packet 704b also includes the non-secure data 764 in a payload 793. An unencrypted portion 792 of payload 793 including the first M bytes of payload 793 (where M is the value of security offset 755) is not encrypted. The remaining bytes of payload 793 are encrypted to secure data 765b. The original integrity check FCS 766a of non-secured message 701 is discarded and new integrity check FCS 766c and ICY 772b are added. Also added is a Security Tag (SecTAG 706b) containing information necessary for decryption.

In EPON 210, the IEEE 801.1AE confidentiality offset feature is expanded. Particularly, the security offset 755 is a configurable value, which can take any integer value, including values less than 30 bytes, as long as the value used by the encrypter and decrypter is not larger than the packet length, as some but not all fields are desirable to be seen. Allowing the security offset 755 to take any integral value exposes just the relevant information needed for the carrier. For example, when it is needed to see the VLAN header and priority, the security offset 755 is set to 4. When also OPCode is needed, security offset 755 is set to 6.

Figure 8:
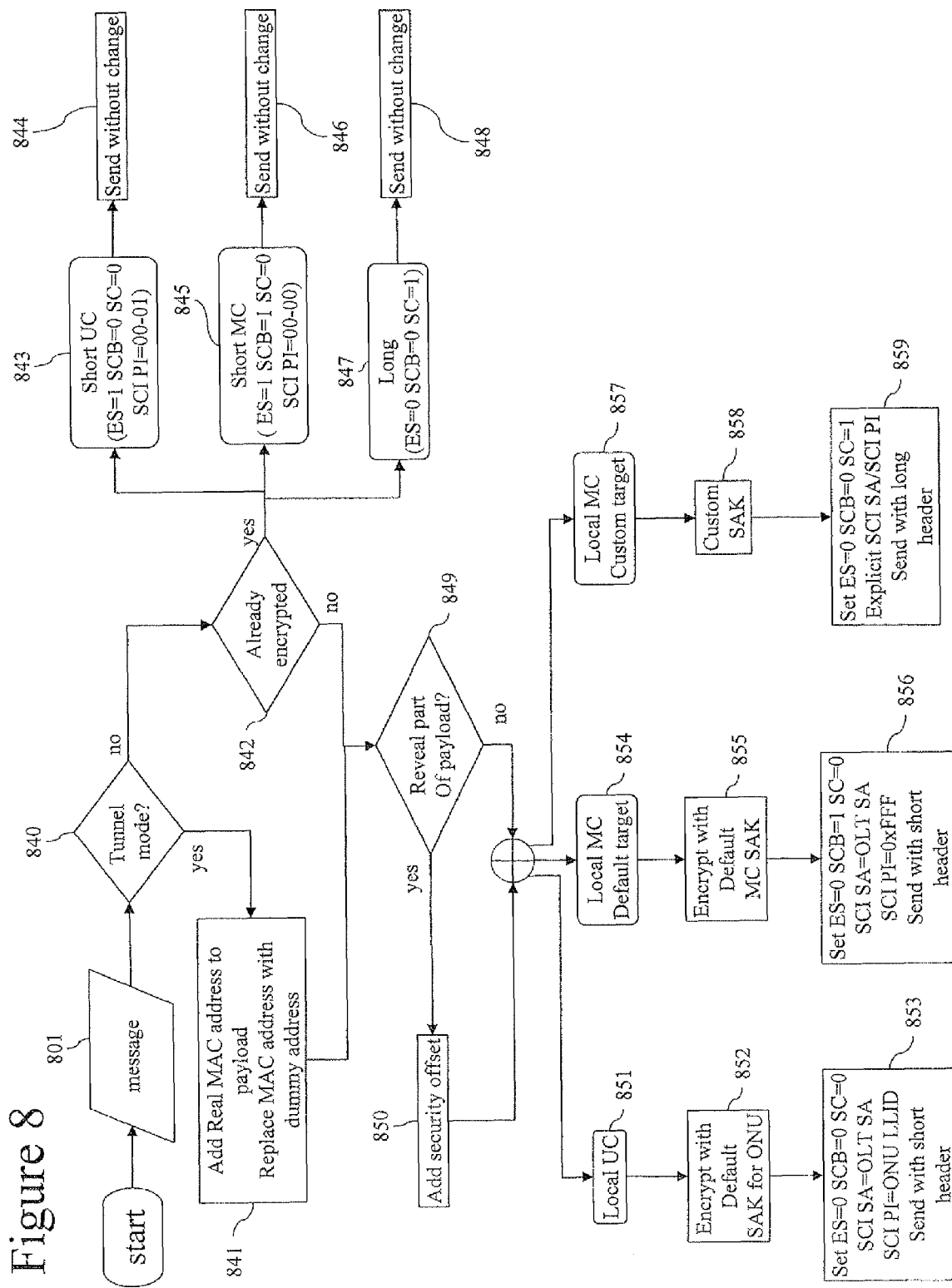
FIG. 8 is a flowchart of encoding packets by an OLT.

FIG. 8 is a generalized flow chart of a method of securing DS communication on an EPON network. An outgoing DS message 801 arrives at the encryption engine of an OLT 212. OLT 212 checks 840 network rules whether messages of the type of message 801 are to be sent in tunnel mode. If "no" message 801 is not to be sent in tunnel mode, then OLT 212 checks 842 if message 801 is already encrypted. If "yes" message 801 is already encrypted then if message 801 is a Ethernet UC message with short MACsec header 843 the SCIs are already set by the end station to ES=1 SCB=0 SC=0 and the SCI.PI to 00-01. Therefore packet is sent 844 without change. If message 801 is a MC message with short MACsec header 845 then the SCIs are already set by the end station to ES=1 SCB=1 SC=0, and SCI.PI to 00-00. Therefore the packet is sent 846 without change. If message 801 is encrypted with a long Ethernet MACsec header 847 then the SCIs are already set by the end station to ES=0 SCB=0 SC=1. Therefore the packet is sent 848 without change.

If according to check 840 network rules determine that messages of the type of message 801 are to be sent in tunnel mode, then message 801 is placed 841 into tunnel mode by adding the DA 561a and SA 562a MAC addresses to the payload and adding new dummy MAC address (DA 562*b* and SA 562*b*) to the packet. Alternatively, one of the MACsec addresses (SA or DA may be left unchanged) while the other MACsec addressed is added to the payload and replaced by a dummy address. In a further alternative, the decision whether to send the message in tunnel mode may be determined individually for message 801 rather than by a network policy for the message type.

If message 801 is to be sent in tunnel mode or if message 801 is not encrypted then the payload (and the original MAC addressed DA 561*a* and SA 562*a* for tunnel mode messages) of message 801 will be encrypted. Before encrypting message 801 OLT 212 checks 849 whether part of the payload of the output packet is to be revealed. If part of the payload is to be revealed, then an appropriate security offset is added 850 revealing the appropriate portion of the payload. The remaining portion of the payload is encrypted.

OLT 212 then determines in what packet form message 801 should be sent based on the message type.

If message 801 is to be sent as a local UC message 851 then the payload is encrypted using the default pre-determined SAK for the target ONU 852 and the SCIs are set as ES=0 SCB=0 SC=0, the SCI.SA is set to the SA of OLT 212 and the SCI.PI is set to the LLID of the target ONU and the packet is sent with the appropriate short header 853.

If message 801 is to be sent as a local MC message to the default target 854 (in network 210 the default MC target is all ONUs 214*a-c*) then the payload is encrypted using the default pre-determined shared SAK for an MC message 855 and the SCIs are set as ES=0 SCB=1 SC=0, the SCI.SA is set to the SA of OLT 212 and the SCI.PI is set to 0xFFF and the packet is sent with the appropriate short header 856.

If message 801 is to be sent as a local MC message to a custom target 857 (in network 210 a custom MC is any two of ONUs 214*a-c*) then the payload is encrypted using a custom SAK 858 and the SCIs are set as ES=0 SCB=0 SC=1, the SCI.SA and the SCI.PI are set explicitly according to IEEE 802.1AE and 802.1af standards and the packet is sent with a long header 859.

Figure 9:
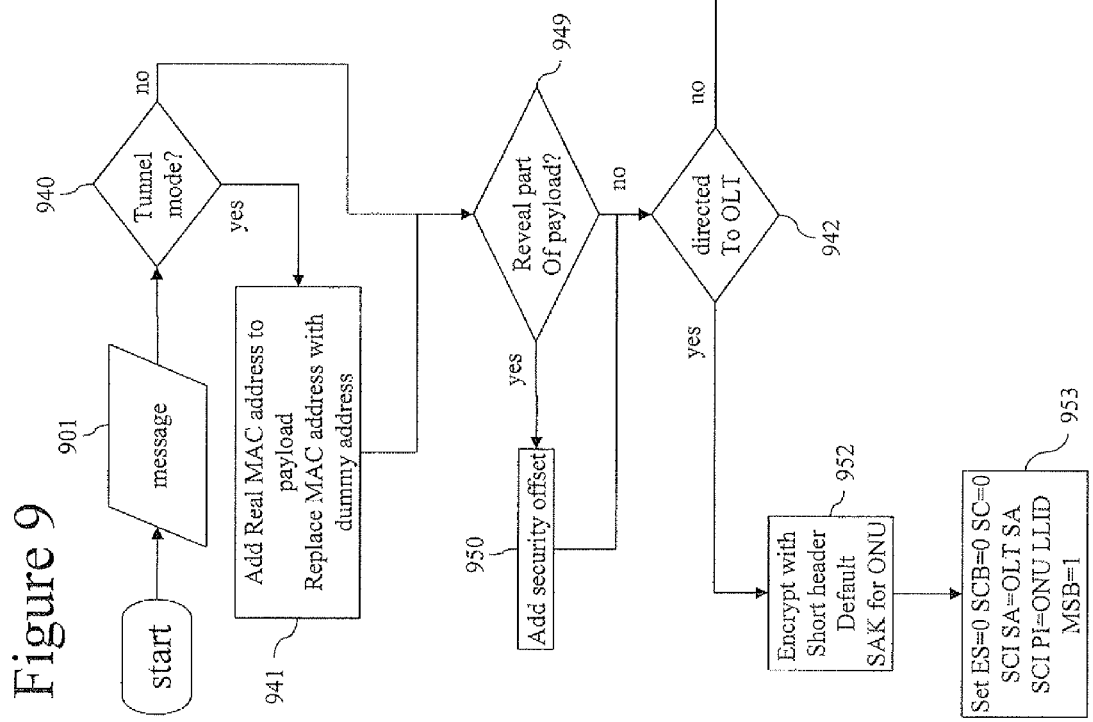
FIG. 9 is a flowchart of encoding packets by an ONU.

FIG. 9 is a flow chart illustrating a method of encrypting a message 901 by ONU 214*a* for US transport. Particularly, ONU 214*b* checks 940 if message 901 is to be sent in tunnel mode. If "yes" then at least one part of the real MAC address (DA 561*a* or SA 562*a*) is replaced 941 by a dummy address (dummy DA 561*b* or dummy SA 562*b*) and the replaced portion of the real L2-MAC address is added to the message payload.

Once the packet DA and SA are determined (either without change [not tunnel mode] or with change [tunnel mode]) it is determined 949 if part of the payload is to be revealed. If part of the payload is to be revealed, then an appropriate security offset is added 950 revealing the appropriate portion of the payload and remaining portion of the payload will be encrypted.

Then ONU 214*b* determines 942 in what packet form message 901 should be sent based on the message type.

If message 901 is a message to OLT 212 (for example a request for bandwidth) then the payload is encrypted 952 using the default US SAK of ONU 214*a* and the SCIs are set ES=0 SCB=0 SC=0 and the SCI.SA is set to the SA of OLT 212 and the SCI.PI is set to the LLID of ONU 214*a* and the MSB is set to 1 953.

If message 901 is to be sent as a short packet 943 to a destination other than OLT 212, then the payload is encrypted 944 using a custom key according to known art and the SCIs are set ES=1 SCB=0 SC=0 and the SCI.SA is set according to prior art standards and the SCI.PI is set to 00-01.

If message 901 is to be sent as a long packet 947 to a destination other than OLT 212, then the payload is encrypted 948 using the default the a custom key according to known art and the SCIs are set ES=0 SCB=0 SC=1 and the SCI.SA and the SCI.PI are set according to prior art standards.

Figures 10A, 10B:
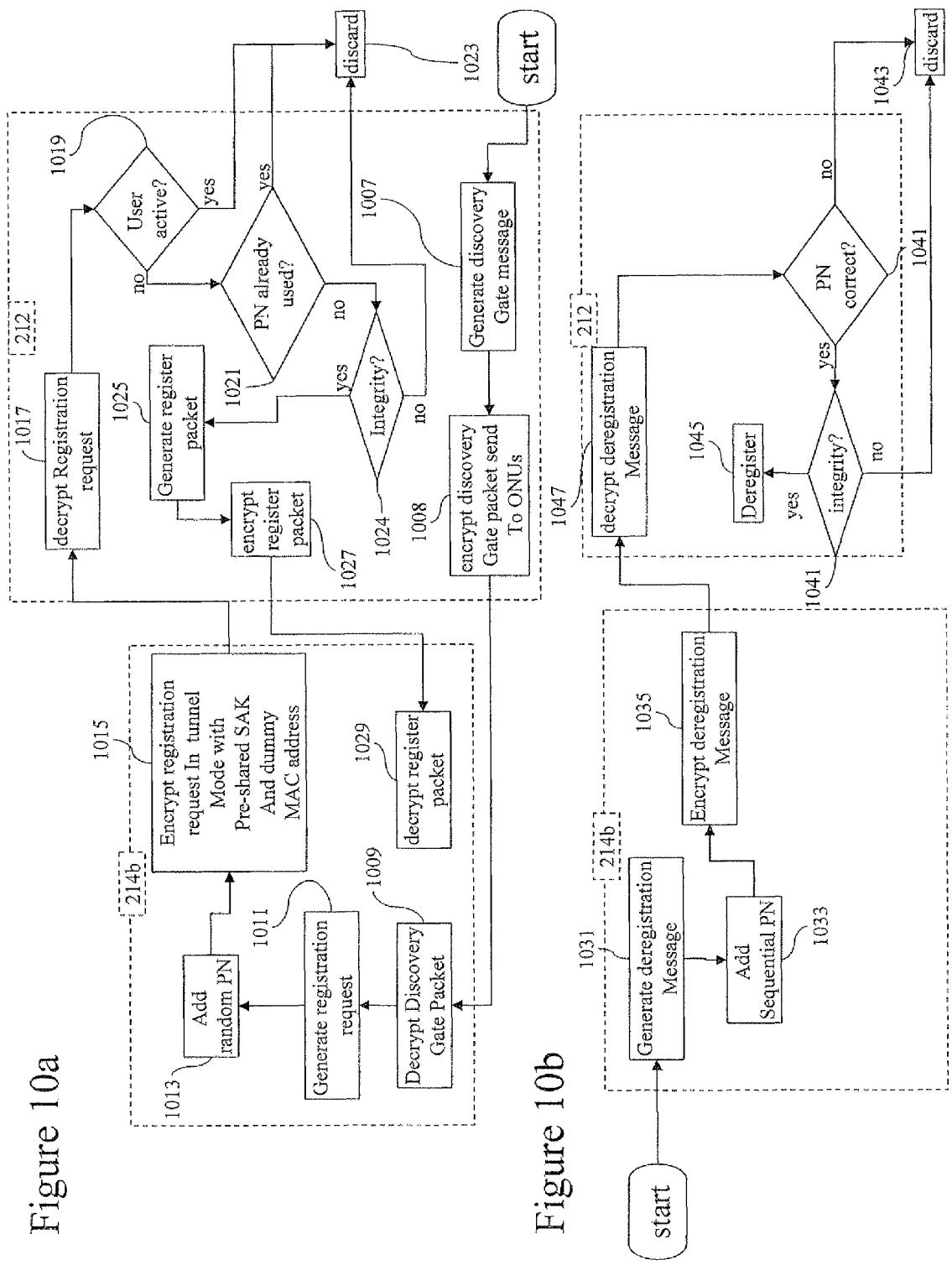
FIG. 10a is a flowchart of secure discovery and registration of an ONU.
FIG. 10b is a flowchart of secure deregistration of an ONU.

FIG. 10*a* is a flow chart illustrating secure discovery and registration of ONU 214*b*. First OLT 212 generates 1007 a discovery gate message (announcing the availability of a discovery time slot [e.g. discovery time slot 9*b* of FIG. 2]) and encrypts 1008 the discovery gate packet using a preshared SCI and SAK known to legitimate ONUs 214*a-c* and sends the discover gate packet DS to ONUs 214*a-c*. ONU 214*b* receives and decrypts 1009 the discovery gate packet and generates 1011*a* registration request message and adds 1013 a random PN number to the registration request. Then ONU 214*b* encrypts 1015 a registration request packet in tunnel mode using a pre-determined and pre-shared SAK and dummy MACsec address. ONU 214*h* sends the resulting tunnel mode registration request packet to OLT 212. OLT 212 decrypts 1017 the tunnel mode registration request packet and checks 1019 if ONU 214*b* is currently active (in the example of EPON 210 an active ONU is an ONU that from which traffic has been recently received, for example the ONU has a pending registration request or has communicated with OLT 212 in the last 100 milliseconds). If ONU 214*b* is active then the registration request packet is discarded 1023. If ONU 214*b* is not active, then OLT 212 checks 1021 the PN of the registration request packet. If the same PN was sent in a recent registration request packet from ONU 214*b* then the registration request packet is discarded 1023. If the PN of the registration request packet is new then OLT 212 tests 1024 the integrity of the registration request packet using ICV 572. If the registration request packet fails the integrity test then the registration request packet is discarded 1023. If the registration request packet passes the integrity test then OLT 212 generates 1025 a register message and encrypts 1027 the register message and sends the resulting register packet according to the network rules for MPCP and OAM packets to ONU 214*b*. ONU 214*b* then receives and decrypts 1029 the register packet.

Thus the secure registration methodology of FIG. 10*a* prevents false registration since only an ONU knowing the proper shared SCIs and SAKs can receive a discovery gate packet or encrypt a legitimate registration request packet. It also prevents spying on ONU 214*b* since the discovery gate packets and registration request packets are encrypted in tunnel mode. Furthermore, while ONU 214*b* is active the secure registration process protects ONU 214*b* from Denial of Service (DoS) attacks where a false user registers as ONU 214*b* automatically nullifying the current registration of ONU 214*b*. Protect against DoS attacks is by four mechanisms. First, when ONU 214*b* is active, competing registration causing DoS is not allowed. Secondly, even if ONU 214*b* is inactive a hostile body to the network will not know the proper SAK and MAC address to generate a false registration request message. Thirdly because the discovery registration process is in tunnel mode, a hostile body will not be able to distinguish a discovery gate packet of OLT 212 or a registration request message of ONU 214*b* to record and replay the registration request packet. Fourthly, even if a hostile body succeeds in replaying a registration request packet, the replayed packet will be rejected because the PN number will be a duplicate of an already used PN and if the hostile body replays the payload but changes the PN the forgery will be detected by the integrity test and the forgery registration packet will be rejected.

FIG. 10b is a flow chart illustrating secure deregistration of ONU 214b. ONU 214b generates 1031 a deregistration message and adds 1033 a sequential PN number and encrypts 1035 the message into a deregistration packet according to the rules of US packets on EPON 210. OLT 212 decrypts 1047 the deregistration packet and checks 1041 that the PN is the correct sequential number. If the PN is not correct, the packet is discarded 1043. If the PN is correct OLT 212 tests 1044 the integrity of the deregistration packet. If the packet fails the integrity check, the packet is discarded 1043. If the packet passes the integrity check, then ONU 214b is deregistered 1045.

Thus DoS deregistration methodology protects ONU 214b from DoS attacks because a hostile body will not have the proper SAK to generate a deregistration packet. False deregistration by replaying a previous deregistration message are prevented because if the deregistration packet is sent in tunnel mode a hostile body will not be able to distinguish a deregistration message and its sender. Furthermore, even if the hostile body does distinguish a deregistration packet, if the hostile body tries to record and replay the deregistration packet, the replayed packet will be rejected because of an improper PN sequence.

In sum, although various example embodiments have been described in considerable detail, variations and modifications thereof and other embodiments are possible. Therefore, the spirit and scope of the appended claims is not limited to the description of the embodiments contained herein.

What is claimed is:

1. An ONU on an EPON coordinated by an OLT, the EPON using MACsec (media access control security) according to IEEE 802.1ae, the ONU configured with:
   (a) a decryption engine including:
      (i) a DecPars module configured to extract a first pre-determined SCI (Secure Channel Identifier) from a first type short MACsec (media access control security) header packet sent from the OLT and said DecPars module further configured to extract a second pre-determined SCI from a second type short MACsec header packet sent from the OLT;
      (ii) a KDB (key data base) configured to fetch a first SAK (secure association key) corresponding to said first pre-determined SCI and configured to fetch a second SAK corresponding to said second pre-determined SCI; and
   said ONU further configured for decrypting respectively the first type and second type packets with said first and second SAKs,
   wherein the PI (port identifier) of the SCIs field (SCI.PI) are configured using an LLID (logical link identifier) of the ONU.

2. The ONU of claim 1, wherein said DecPars module is further configured to parse a secure packet sent in tunnel mode from the OLT, said secure packet having:
   i) non-secure packet data and MAC addresses securely encrypted into secure data of the secure packet; and
   ii) a short MACsec (media access control security) header which uses:
      A) a local MAC (media access control) destination address;
      B) a secure channel identifier (SCI) secure association (SA) field (SCI.SA) as a MAC source address; and
      C) an SCI port identifier (PI) field (SCI.PI) as the LLID which is given by the OLT to the ONU upon registration and is unique per ONU.

3. The ONU of claim 1, wherein the decryption engine further comprising:
   c) a FRB (frame rebuilder) module configured to discard said first type short MACsec packet when said first type short MACsec packet includes an incorrect PN (packet number).

4. The ONU of claim 1, wherein said KDB is further configured to store a pre-shared SAK for a MPCP message.

5. The ONU of claim 1, wherein said DecPars module is further configured to parse said first type short MACsec packet having a security offset of less than 30 bytes.

6. An OLT on an EPON, the EPON including a plurality of ONUs, the EPON using MACsec (media access control security) according to IEEE 802.1ae, the OLT configured with:
   a) a decryption engine including:
      (i) a DecPars module configured to extract a first pre-determined SCI from a first type short MACsec header packet sent from an ONU of the plurality of ONUs and configured to extract a second pre-determined SCI from a second type short MACsec header packet sent from said ONU;
      (ii) a KDB configured to fetch a first SAK corresponding to said first pre-determined SCI and configured to fetch a second SAK corresponding to said second pre-determined SCI; and
   said OLT further configured for decrypting respectively the first type and second type packets with said first and second SAKs,
   wherein the PI (port identifier) of the SCIs are configured using an LLID (logical link identifier) of the ONU.

7. The OLT of claim 6, wherein said DecPars module is further configured to parse a secure packet sent in tunnel mode from said ONU, said secure packet having:
   i) an entire non-secure packet data and MAC addresses securely encrypted into secure data of the secure packet; and
   ii) a short MACsec (media access control security) header which uses:
      A) a local MAC media access control destination address;
      B) a secure channel identifier (SCI) secure association (SA) field (SCI.SA) as a MAC source address; and
      C) an SCI port identifier (PI) field (SCI.PI) as the LLID which is given by the OLT to the ONU upon registration and is unique per ONU.

8. The OLT of claim 6, wherein the decryption engine further comprising:
   c) a FRB module configured to discard said first type short MACsec header packet when said first type short MACsec header packet includes PN that is out of sequence.

9. The OLT of claim 6, wherein the decryption engine further comprising: c) a FRB module configured to discard said first type short MACsec header packet when said first type short MACsec header packet includes a previously used PN.

10. The OLT of claim 6, wherein said KDB is further configured to store a pre-shared SAK for decrypting a registration request message.

11. The OLT of claim 6, wherein said DecPars module is further configured parse said first type short MACsec header packet having a security offset of less than 30 bytes.

12. A secure EPON comprising:
   a) an OLT configured for:
      i) configuring a PI (Port Identifier) of an SCI (Secure Channel Identifier) field (SCI.PI) of a packet, said configuring using an LLID (Logical Link Identifier) of an ONU of a plurality of ONUs, wherein said packet is a DS (Down Stream) packet to be transmitted over the EPON from the OLT to said ONU;
   ii) encrypting said packet with a separate SAK based on the SCI, said packet having a short MACsec (media access control security) header, and
   b) an ONU configured for:
   i) decrypting said packet according to said separate SAK based on the above described SCI.

13. The secure EPON of claim 12 wherein said OLT is further configured for:
   iii) determining a type for said packet, wherein said type is selected from the group consisting of:
      A) UC (Unicast);
      B) MC (Multicast);
      C) OAM (Operations and Maintenance);
      D) MPCP (Multi Point Communications Protocol);
      E) gate;
      F) grant; and
      G) request;
   iv) if said type is a first type packet having a first short MACsec header, said separate SAK is a first pre-determined SAK; and
   v) if said type is a second type packet having a second short MACsec header, said separate SAK is a second pre-determined SAK.

14. The secure EPON of claim 12 wherein said OLT is further configured for:
   a) transforming an entire non-secure packet to a secure packet having a short MACsec header which uses a local MAC destination address, said transformation including securely encrypting non-secure packet data and MAC addresses into secure data of the secure packet; and
   b) configuring said secure packet with a short MACsec header secure channel identifier (SCI) secure association (SA) field (SCI.SA) as a MAC source address, and an SCI port identifier (PI) field (SCI.PI) as the LLID which is given by the OLT to the ONU upon registration and is unique per ONU.

15. The secure EPON of claim 12 wherein
   c) said ONU is further configured with a pre-determined key;
   d) said OLT is further configured to send a discovery gate message encrypted using said pre-determined key; and
   e) said OLT and said ONU configured to encrypt subsequent communications by:
      i) determining a type for a packet, wherein said type is selected from the group consisting of:
         A) UC (Unicast);
         B) MC (Multicast);
         C) OAM (Operations and Maintenance);
         D) MPCP (Multi Point Communications Protocol);
         E) gate;
         F) grant; and
         G) request;
      ii) if said type is a first type packet having a first short MACsec (media access control security) header, encrypting said packet using a first pre-determined SAK (secure association key); and
      iii) if said type is a second type packet having a second short MACsec header, encrypting said packet using a second pre-determined SAK.

16. The secure EPON of claim 15 wherein said ONU is further configured to include a random PN in said encrypted registration request packet.

17. The secure EPON of claim 15 wherein said ONU is further configured to send said encrypted registration request packet with a dummy MAC address.

18. The secure EPON of claim 12 wherein said OLT is further configured to refuse a registration request packet of said ONU when said ONU is active.

19. A method of securing communication on an EPON, the EPON including an OLT (Optical Line Terminal) and a plurality of ONUs (Optical Networking Units), the method comprising the steps of:
   a) configuring a PI (Port Identifier) of an SCI (Secure Channel Identifier) field (SCI.PI) of a packet, said configuring using an LLID (Logical Link Identifier) of an ONU of the plurality of ONUs, wherein said packet is a DS (Down Stream) packet to be transmitted over the EPON from the OLT to said ONU;
   b) encrypting said packet with a separate SAK based on the SCI, said packet having a short MACsec (media access control security) header.

20. The method of claim 19, further including determining a type for said packet, wherein said type is selected from the group consisting of:
   i) UC (Unicast);
   ii) MC (Multicast);
   iii) OAM (Operations and Maintenance);
   iv) MPCP (Multi Point Communications Protocol);
   v) gate;
   vi) grant; and
   vii) request;
   c) if said type is a first type packet having a first short MACsec header, said separate SAK is a first pre-determined SAK; and
   d) if said type is a second type packet having a second short MACsec header, said separate SAK is a second pre-determined SAK.

21. The method of claim 19 further comprising the step of:
   c) adding a security offset having a length of less than 30 bytes to said first type packet.

22. The method of claim 19, wherein said encrypting may include setting a SCI.SA of said first type packet to a SA of the OLT.

23. The method of claim 19 wherein a first type packet is to be transmitted upstream over the EPON from said ONU to the OLT, further comprising:
   configuring a PI (Port Identifier) of an SCI (Secure Channel Identifier) field (SCI.PI) of a packet, said configuring using an LLID (Logical Link Identifier) of an ONU of the plurality of ONUs;
   d) configuring a MSB (most significant bit) of a SCI.SA to differentiate between said first type packet transmitted US (upstream) and said packet transmitted DS (downstream); and
   e) encrypting said first packet with a separate SAK based on the SCI, said packet having a short MACsec (media access control security) header.

24. A method of securing communication on an EPON, the EPON including an OLT and a plurality of ONUs, the method comprising the steps of:
   a) configuring at least one ONU of the plurality of ONUs with a pre-determined key;
   b) sending by the OLT a discovery gate message to the ONUs, said discovery gate message encrypted using said pre-determined key; and
   c) encrypting subsequent communications by:
      i) determining a type for a packet, wherein said type is selected from the group consisting of:
         A) UC (Unicast);
         B) MC (Multicast);
         C) OAM (Operations and Maintenance);
         D) MPCP (Multi Point Communications Protocol);

E) gate;
F) grant; and
G) request;

ii) if said type is a first type packet having a first short MACsec (media access control security) header, encrypting said packet using a first pre-determined SAK (secure association key); and iii) if said type is a second type packet having a second short MACsec header, encrypting said packet using a second pre-determined SAK.

25. The method of claim 24 further comprising:
d) sending by said at least one ONU a register request message to the OLT, said register request message encrypted using said pre-determined key.

26. The method of claim 25 further comprising the step of:
e) including a random packet number (PN) in said encrypted registration request packet.

27. The method of claim 25 further comprising the step of:
e) addressing said encrypted registration request packet with a dummy SA.

28. The method of claim 25 further comprising the step of:
e) discarding by the OLT of said encrypted registration request packet when said other ONU is active.

29. A method of securing communication on an EPON between an OLT and an ONU in DS (downstream) and in US (upstream) communications, the method comprising the steps of:

a) transforming an entire non-secure packet to a secure packet having a short MACsec (media access control security) header which uses a local MAC (media access control) destination address, said transformation including securely encrypting non-secure packet data and MAC addresses into secure data of the secure packet; and b) configuring said secure packet with a short MACsec header secure channel identifier (SCI) secure association (SA) field (SCI.SA) as a MAC source address, and an SCI port identifier (PI) field (SCI.PI) as the LLID which is given by the OLT to the ONU upon registration and is unique per ONU.

* * * * *